Sept. 11, 1923.
E. G. JOHNSON
COUPLING
Filed Sept. 1, 1922
1,467,730
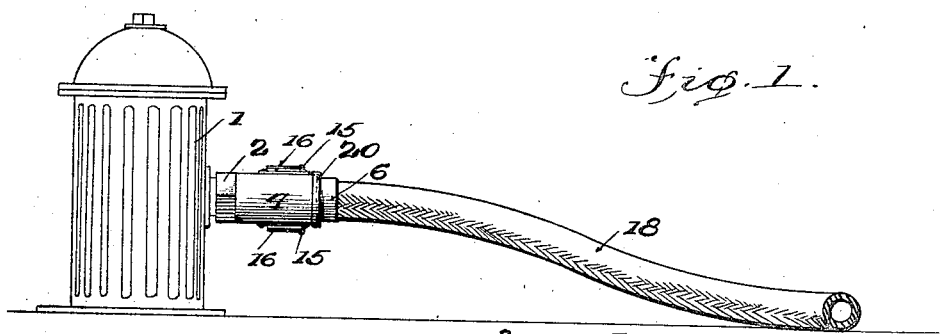
*Fig. 1.*
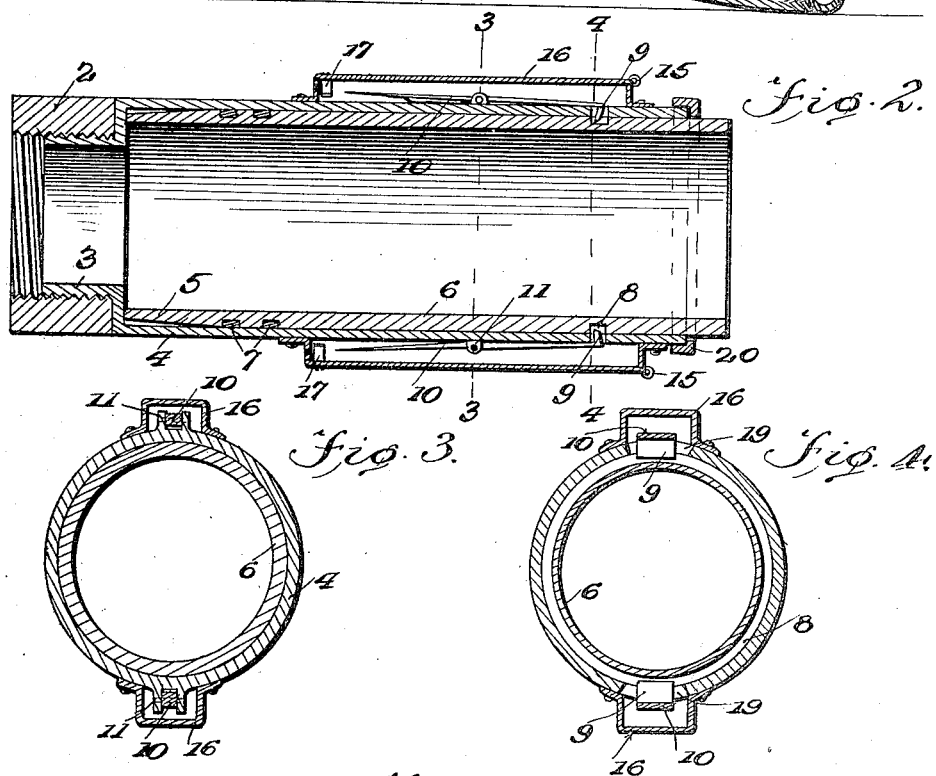
*Fig. 2.*
*Fig. 3.*
*Fig. 4.*
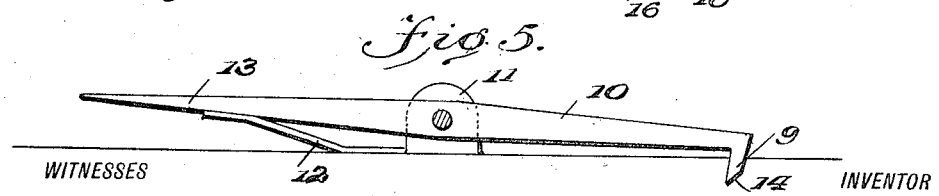
*Fig. 5.*
WITNESSES
INVENTOR
Elmer G. Johnson,
BY
ATTORNEYS Patented Sept. 11, 1923.

1,467,730

UNITED STATES PATENT OFFICE.

ELMER GOTTFRIED JOHNSON, OF HIBBING, MINNESOTA.

COUPLING.

Application filed September 1, 1922. Serial No. 585,730.

*To all whom it may concern:*

Be it known that I, ELMER G. JOHNSON, a citizen of the United States, and a resident of Hibbing, in the county of St. Louis and State of Minnesota, have invented certain new and useful Improvements in Couplings, of which the following is a specification.

This invention relates to couplings, and has for its object the provision of a device for easily and rapidly attaching a hose to a fire plug, whereby firemen will not lose any time in getting their equipment ready for putting out fires.

A further object of the invention is the provision of an attachment in connection with fire plugs that is capable of being locked against manipulation by unauthorized persons in order that the attachment will be in proper working condition when it is desired to use the plug for the purposes contemplated.

A further object of the invention is to provide cooperating members which may be instantly and automatically connected, and which are at the same time, sealed to prevent loss of water at the point where so joined.

This invention will be best understood from a consideration of the following detailed description in view of the accompanying drawing forming a part of this specification; nevertheless, it is to be understood that the invention is not confined to the disclosure, being susceptible of changes or modifications, but such changes or modifications shall mark no material departure from the salient features of the invention as expressed in the appended claims.

Figure 1 is a view in elevation of a fire plug with my improved coupling applied for connecting a hose to the plug, Figure 2 is a longitudinal section of the coupling means.

Figure 3 is a transverse vertical view taken along the line 3—3 of Figure 2,

Figure 4 is a transverse vertical view taken along the line 4—4 of Figure 2,

Figure 5 is an enlarged detailed side view of the automatic locking means.

Referring to the drawings, 1 indicates a fire plug provided with a nozzle upon which is adapted to be screwed an internally threaded coupling 2, and which is adapted to receive the threaded reduced end 3 of a cylindrical member 4. This member forms part of the attachment and is to be permanently fixed to the fire plug by screwing the reduced end 3 of the member into the coupling nut 2. The inner wall of the tubular member 4 adjacent its inner end is tapered in order to receive the tapered end 5 of the tubular member 6 which is insertable within the tubular member 4. The tapering of the wall 5 of the member 6 is coincident to the taper of the inner wall of the bore of the tubular member 4, so that as the member 6 is inserted within the member 4, that a snug fit will be had between these tapered portions.

Located within annular grooves in the outer wall of the tubular member 6 are split rings 7 adapted to engage the wall of the bore of the tubular member 4 and to cooperate with the tapered portion of the two members to provide a seal between the two members and prevent water from leaking between the tubular members when properly inserted and locked together.

The movable member 6 is provided with an annular groove 8 adjacent its outer end which is adapted to receive the catch 9 formed on one end of the pivoted latch member 10, the latch member being pivoted between ears 11 integrally formed or secured to the outer wall of the fixed member 4. Pairs of the ears and the latch members are mounted at diametrically opposite points on the outer wall of the tubular member 4 with a spring 12 engaging the finger piece 13 of the latch member to maintain the catches 9 within the annular groove 8 when the movable member 6 has been inserted within the fixed member 4, and whereby the movable member is locked in position within said fixed member.

As shown more particularly in Figure 5, the outer free end of the catch 9 of the latch members is cut away as shown at 14 in order that the tapered end 5 of the movable member 6 may ride readily within the fixed member 4, being engaged by the inclined portion 14, with the inclined portion offering no obstruction to the passage of the movable member 6. Secured at diametrically opposite points and in protective relation with the latch members 11 are casings 15 which are provided with a movable cover 16 and a lock 17 for locking the cover in position on the casing 15, and thereby preventing manipulation of the latches 10 by unauthorized persons.

Since the tubular member 4 is fixed in position on the plug 1, and the cover 16 is locked in position on the casing 15, unauthorized persons will not be able to tamper with the latch members 11. The key for the lock 17 is carried by the fireman and can only be opened by him, although it will not be necessary to unlock the cover to apply the movable member 6 to the fixed member 4. A hose 18 is connected in any approved manner to the movable member or nozzle 6. With the nozzle in position on the end of the hose, it will only be necessary for the fireman to shove the nozzle 6 into the fixed tubular member 4 until the tapered portion 5 of the nozzle will be engaged by the tapered portion of the bore of the fixed member 4 when the latches 11 will automatically snap within the annular grooves 8 of the movable member 6 with the catch 9 moving through an opening 19 within the fixed member 4. This action provides for a perfect sealing of the two members with the members being locked against release by any other than an authorized person, since it would be necessary to unlock the cover 16 in order to operate the latches 11 for removing the catches 9 from the annular groove 8 in order to release the nozzle 6 from the fixed tubular member 4.

After the nozzle 6 has been removed and it is not desired to use the coupling, a cap 20 is slipped over the outer end of the fixed member 4 to prevent dust and dirt from entering the same.

I claim:—

1. An automatic coupling, comprising a fixed cylindrical member provided with a tapering bore, a movable member adapted to be inserted into the fixed member, and having its outer wall adjacent one end tapered coincident to the tapering of the fixed member, piston rings in the walls of the movable member engageable with the walls of the bore, and cooperating with the tapering walls of both members to provide a seal between said members, latch members pivotally mounted on the fixed member and adapted to engage an annular groove in the movable member when said movable member is inserted within the fixed member for automatically locking the movable member within the fixed member, and casings enclosing the latch member and provided with a cover adapted to be in locked position on the casing to prevent unauthorized actuation of the latch member.

2. An automatic coupling, comprising a fixed cylindrical member provided with a tapering bore at one end and an annular groove in its outer wall adjacent its other end, a movable member adapted to be inserted within the fixed member and having its outer wall adjacent one end tapered coincident to the taper of the fixed member, piston rings provided in grooves in the movable member adjacent its tapered end with the rings engageable with the walls of the bore of the fixed member and cooperating with the tapered walls of both members to provide a seal between said members, latch members pivotally mounted at diametrically opposite points on the outer wall of the fixed member and provided with catches at one end operating within slots in the fixed member and engageable with the annular groove in the movable member, springs urging the latch members to engage the annular grooves, casings enclosing the latch members and secured at diametrically opposite points to the outer wall of the fixed member, covers pivotally mounted on the casings and adapted to be locked to the casing to prevent unauthorized manipulation of the latch members, said latch members adapted to automatically engage the annular groove in the movable member when said movable member is inserted within the fixed member.

3. An automatic coupling comprising a fixed cylindrical member provided with a tapering bore and diametrically disposed perforations adjacent its outer end, a movable member adapted to be inserted into the fixed member and having its outer wall adjacent one end tapered coincident to the tapering of the fixed member, levers pivotally mounted on the outer wall of the fixed member and provided with depending and inwardly turned catches projecting through the diametrically disposed perforations in the fixed member and adapted to engage an annular groove in the movable member when said movable member is inserted within the fixed member for automatically locking the movable member within the fixed member, and locking means embracing the levers to prevent unauthorized manipulation of said levers when the movable member is inserted within the fixed member.

ELMER GOTTFRIED JOHNSON.